US012809856B2

(12) United States Patent
Sujanmulk et al.

(10) Patent No.: US 12,809,856 B2
(45) Date of Patent: Nov. 24, 2026

(54) OPTIMIZED SYSTEM AND METHOD FOR QUERY RESPONSE GENERATION ENHANCING THE PREDICTIVE INSIGHT INTELLIGENCE ON STRUCTURED AND UNSTRUCTURED DATA THROUGH NATURAL LANGUAGE GENERATION

(71) Applicant: Dell Products L.P., Round Rock, TX (US)

(72) Inventors: Praveen Sujanmulk, Vijayawada (IN); Srishti Gupta, Bangalore (IN); Saurabh Jha, Austin, TX (US); Harshitha G S, Tiptur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/888,843

(22) Filed: Sep. 18, 2024

(65) Prior Publication Data

US 2026/0079918 A1 Mar. 19, 2026

(51) Int. Cl.
*G06F 16/242* (2019.01)
*G06F 16/2457* (2019.01)

(52) U.S. Cl.
CPC ........ *G06F 16/2423* (2019.01); *G06F 16/243* (2019.01); *G06F 16/24575* (2019.01)

(58) Field of Classification Search
CPC ............... G06F 16/2423; G06F 16/243; G06F 16/24575
See application file for complete search history.

(56) References Cited

U.S. PATENT DOCUMENTS

| | | | | |
|---|---|---|---|---|
| 12,346,314 | B1 * | 7/2025 | Guerra | G06F 16/235 |
| 2022/0113994 | A1 * | 4/2022 | Singh | G06N 3/09 |
| 2023/0214670 | A1 * | 7/2023 | Liu | G06N 3/08 706/46 |
| 2025/0156453 | A1 * | 5/2025 | Conway | G06F 16/338 |
| 2025/0217769 | A1 * | 7/2025 | Kumar | G06F 16/332 |

* cited by examiner

*Primary Examiner* — Charles Rones
*Assistant Examiner* — Xiaoqin Hu
(74) *Attorney, Agent, or Firm* — Chamberlain, Hrdlicka, White, Williams & Aughtry; Aly Z. Dossa

(57) ABSTRACT

A method for query response generation using a query system, the method including receiving a user query from a user, generating an altered query using the user query, wherein the altered query is associated with a user intent of the user, generating a function call using the user intent and the altered query, executing the function call to generate a result, converting the result into a natural language result, making a first determination that the natural language result satisfies a predetermined threshold, and providing, in response to the first determination, the natural language result to the user.

13 Claims, 6 Drawing Sheets

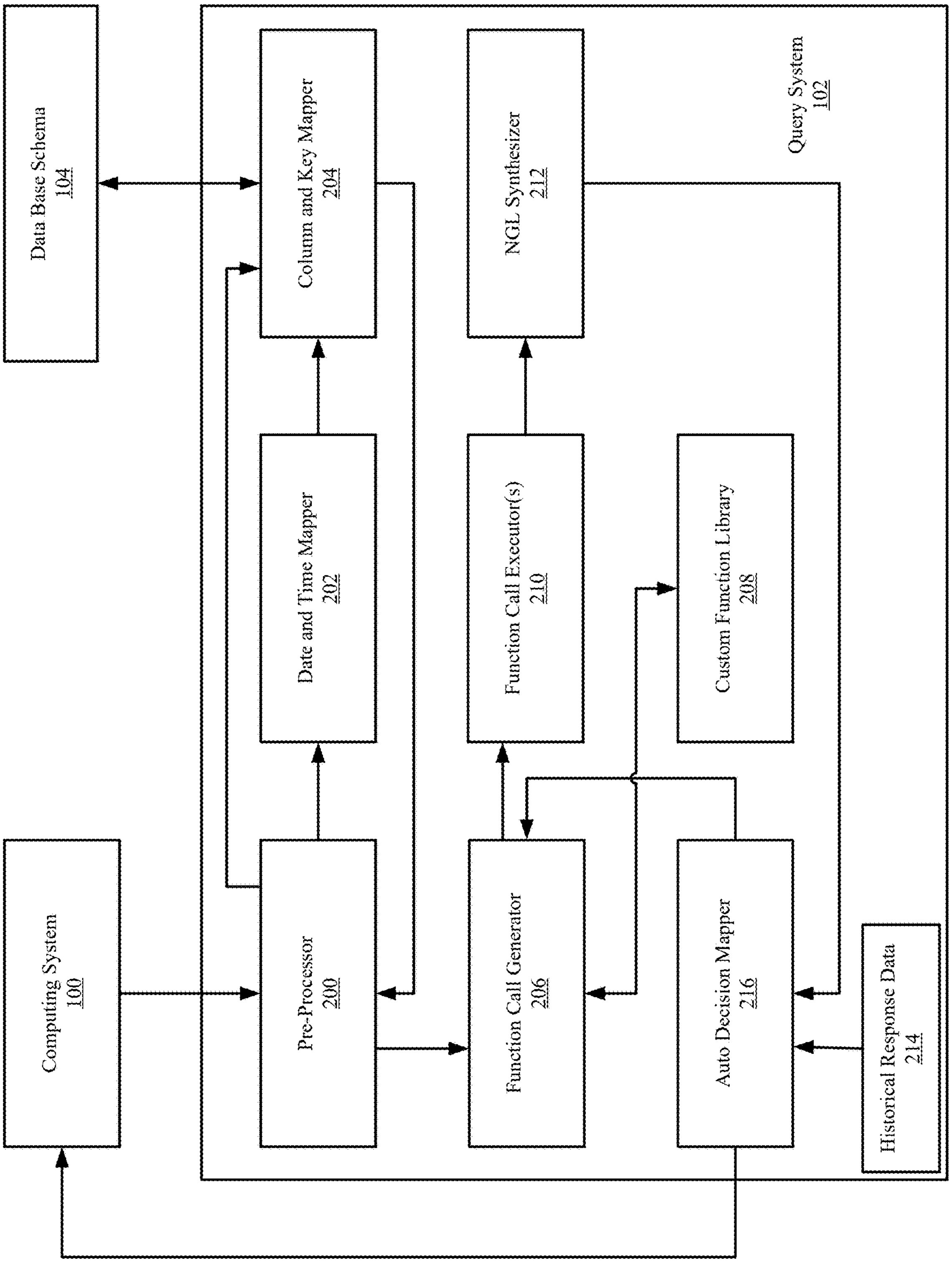
FIG. 2.1

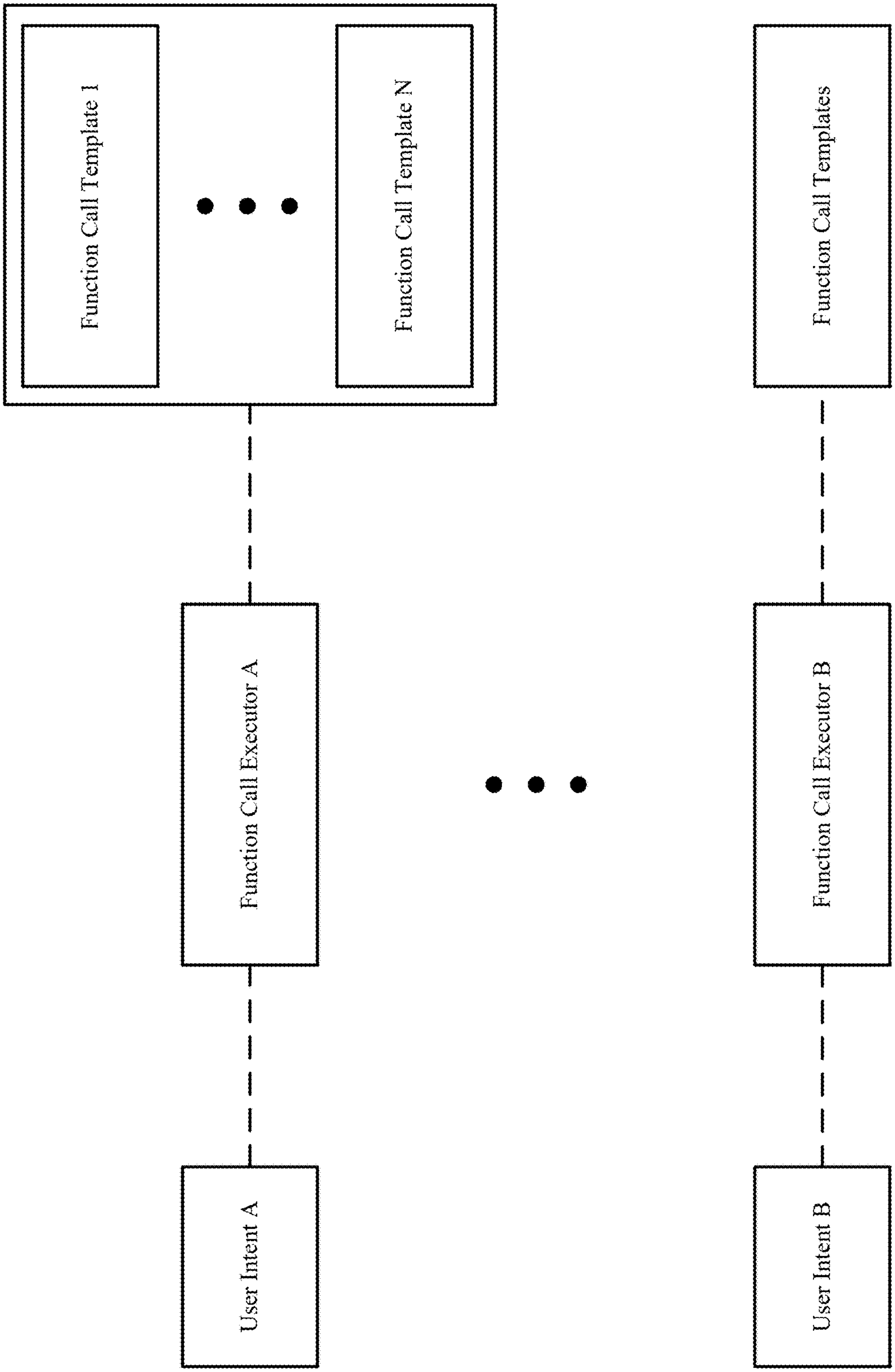
FIG. 2.2

OPTIMIZED SYSTEM AND METHOD FOR QUERY RESPONSE GENERATION ENHANCING THE PREDICTIVE INSIGHT INTELLIGENCE ON STRUCTURED AND UNSTRUCTURED DATA THROUGH NATURAL LANGUAGE GENERATION

BACKGROUND

Users often use natural language queries to obtain answers to questions from computing systems. However, to be able to obtain useful responses from natural language queries, the computing systems need to be optimized. The optimization process can be a time and resource intensive process.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 2.1 shows a diagram of a query system in accordance with one or more embodiments of the invention.

FIG. 2.2 shows relationships between various components in the system in accordance with one or more embodiments of the invention.

DETAILED DESCRIPTION

Generating accurate and meaningful answers from complex queries issued to databases is of paramount importance due to several factors including, but not limited, to data accessibility, decision-making, business intelligence, and reporting. Human-machine co-work is a challenging task that requires complex reasoning over both explicit constraints described in the textual context and user intent. One of the most challenging problems in human-machine co-work is the gap between human intention and the machine's understanding and execution.

Traditionally, query systems are employed for this task, but they are often limited in their ability to infer the user's context and intent and, as such, heavily rely on a well-structured user queries for this purpose. As a result, if a user query lacks detail or precision, the query system may produce inaccurate or incomplete results.

As a result of the limitations of traditional query systems discussed above, embodiments of the invention are directed to a query system that is able to determine user intent and then use the user intent in combination with a feedback mechanism to generate more accurate and/or complete results (i.e., results that captures or more closely captures what the user is requesting in their query).

The following describes one or more embodiments.

Figure 1:
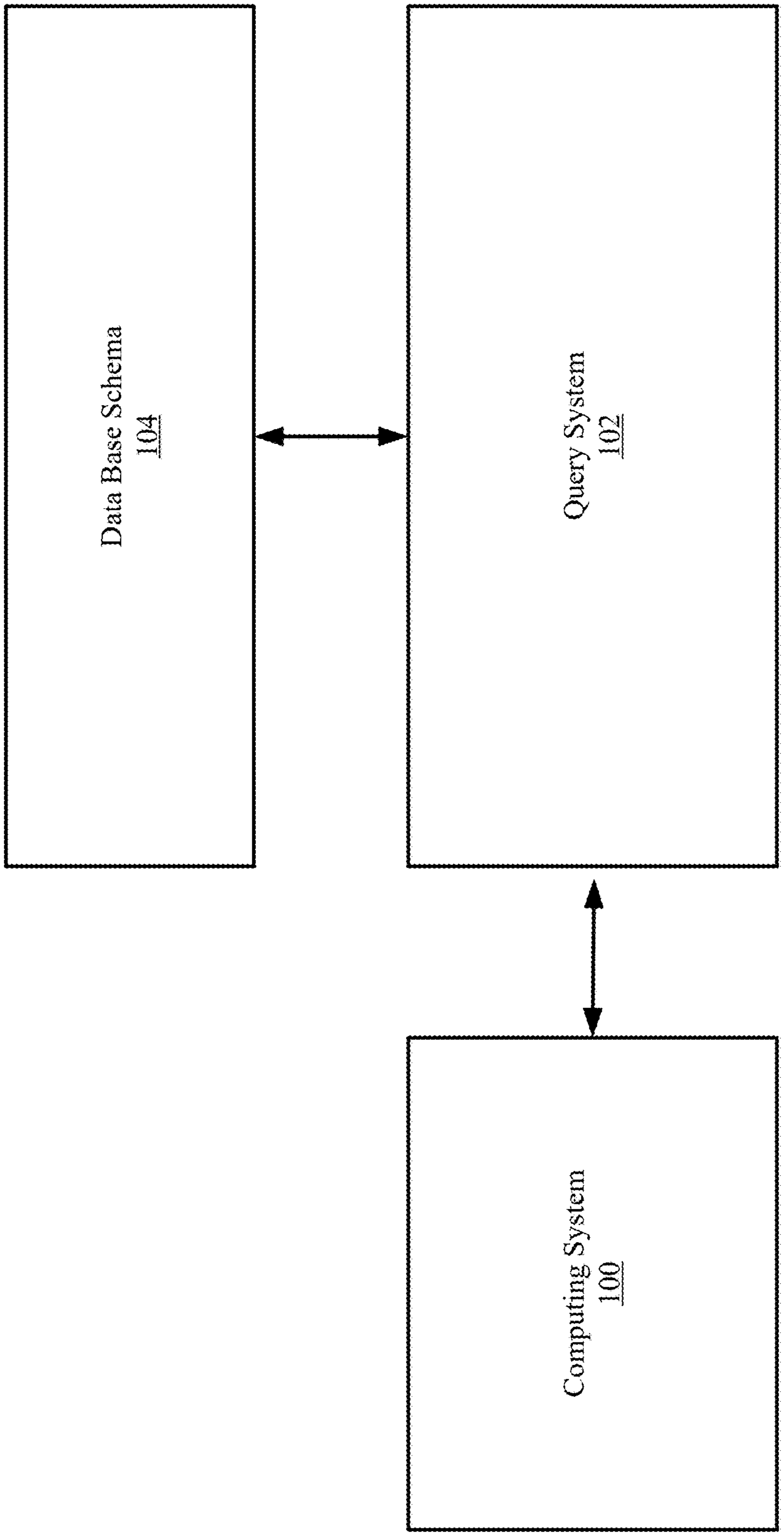
FIG. 1 shows a diagram of a system in accordance with one or more embodiments.

FIG. 1 shows a system in accordance with one or more embodiments. The system may include a computing system (100), a query system (102), and a data base schema (104). The system may include additional, fewer, and/or different components without departing from the scope of the invention. Each of these system components is described below.

Though not shown in FIG. 1, the aforementioned components may be operatively connected through a wired and/or wireless network (e.g., a local area network (LAN), a wide area network (WAN) such as the Internet, a mobile network, any other network type, or a combination thereof). Further, the network may encompass various interconnected, network-enabled subcomponents (or systems) (e.g., switches, routers, gateways, etc.) that may facilitate communications between the aforementioned components. Moreover, the aforementioned components may communicate with one another using any combination of wired and/or wireless communication protocols.

In one or more embodiments, the computing system (100), the query system (102) and the data base schema (104) may be located on a single physical and/or logical computing system.

In one or more embodiments, the computing system (100) includes functionality to permit users to interact with the query system (102). More specifically, in one or more embodiment, the computing system (100) may include functionality to: receive user inputs including any structured and/or unstructured data (e.g., audio or textual information) from the user; receive responses; and provide the responses to the query system (102), receive feedback (e.g., additional user inputs reflecting whether the responses properly addressed the user inputs), and provide responses for the user query to the user. In one or more embodiments, the computing system (100) may take the form of a chatbot or a similar interface. Further, the computing system (100) includes functionality to perform at least a portion of the methods shown in FIGS. 3-4. One of ordinary skill will appreciate that the computing may perform other functionalities without departing from the scope of the invention.

In one or more embodiments disclosed herein, the computing system (100) may be a physical device (see e.g., FIG. 5) such as, e.g., a laptop, a cell phone, a tablet computer, a server, etc.). In another embodiment of the invention, the computing system (100) may be implemented on a virtual device (e.g., a virtual machine executing on one or more physical devices).

In one or more embodiments, the query system (102) includes functionality to generate natural language results from the user query. In one or more embodiments, the query system (102) utilizes models to accurately capture user intent. In one or more embodiments, the query system (102) also leverages reward models and historical results to enhance the accuracy of the natural language results. Further, the query system (102) includes functionality to perform at least a portion of the methods shown in FIGS. 3-4. One of ordinary skill will appreciate that the query system may perform other functionalities without departing from the scope of the invention. Additional detail regarding one or more embodiments of the query system (102) is described in FIG. 2.1.

In one or more embodiments disclosed herein, the query system (102) may be a physical device (see e.g., FIG. 5) such as, e.g., a laptop, a cell phone, a tablet computer, a server, etc.). In another embodiment of the invention, the query system (102) may be implemented on a virtual device (e.g., a virtual machine executing on one or more physical devices).

In one or more embodiments, the data base schema (104) defines the relationships between the information in one or more databases (not shown). The data base schema may, e.g., specify the structure and content of tables in a database. For example, for each in a database, the data base schema may specify one or more columns along with the type of data stored in the columns. Further, continuing with the example, the data base schema may also specify the relationships between the tables.

The data base schema (104) may be stored on volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments disclosed herein, the data base schema (104) may be hosted on a physical device (see e.g., FIG. 5) or a virtual device.

FIG. 2.1 shows a diagram of a query system in accordance with one or more embodiments of the invention. More specifically, in one or more embodiments of the invention, the query system (102) includes a pre-processor (200), a data and time mapper (202), a column and key mapper (204), a function call generator (206), a custom function library (208), a function call executor (210), a Natural Language Generation (NLG) synthesizer (212), historical response data (214), and an auto decision mapper (216). Each of these components is described below.

In one or more embodiments, the pre-processor (200) includes functionality to perform preliminary processing to convert unstructured data (e.g., a natural language user query) into a machine-readable format in order to ultimately generate an altered query. The pre-processor (200) may use date and time information from the data and time mapper (202) and column and key information from the column and key mapper (204) to generate the altered query. In one or more embodiments, the pre-processor (200) may also utilize models to determine user intent. These models leverage attention-based span-based dynamic convolutions to accommodate contextual information in the text, thus increasing accuracy of the determined user intent. Further, in one or more embodiments, the pre-processor may provide the altered query and the user intent to the other components of the query system (102). Further, the pre-processor (200) includes functionality to perform at least a portion of the methods shown in FIGS. 3-4. One of ordinary skill will appreciate that the pre-processor (200) may perform other functionalities without departing from the scope of the disclosure.

In one or more embodiments, the date and time mapper (202) includes functionality to extract date and time information from unstructured data (e.g., a user query) and convert it into structured data (e.g., a machine-readable format). In one or more embodiments, the date and time mapper supports the pre-processor (200) and the column and key mapper (204). Further, the pre-processor (200) includes functionality to perform at least a portion of the methods shown in FIGS. 3-4. One of ordinary skill will appreciate that the date and time mapper (202) may perform other functionalities without departing from the scope of the disclosure.

In one or more embodiments, the column and key mapper (204) includes functionality to obtain column and key information from a data base schema (e.g., 104, FIG. 1) using unstructured data (e.g., a user query). The column and key information correspond to column names, which include data that will be used to service query. Said another way and as further detailed below, in order to generate results for the user query, the query system obtains data from a database(s) (not shown). The column and key information identify the tables and, more specifically, columns within the tables that include the data that relevant to generate the response. The column and key mapper (204) may also use date and time information from the date and time mapper (202) to obtain the column and key information. In a non-limiting example, the column name from a user query requesting "collector names" may be "collector_name." Further, the column and key mapper (204) includes functionality to perform at least a portion of the methods shown in FIGS. 3-4. One of ordinary skill will appreciate that the column and key mapper (204) may perform other functionalities without departing from the scope of the disclosure.

In one or more embodiments, the function call generator (206) includes functionality to generate a function call. The function call generator (206) also includes the functionality to choose a suitable function call executor (210) (defined below) and a suitable function call template from a set of function call templates (described below) associated with the function call executor (210) as shown in FIG. 2.2. In one or more embodiments, the function call generator (206) includes the functionality to retrieve the function call template from the custom function library (208). In one or more embodiments, the function call generator (206) may utilize a reward system modeled on a multi-agent stochastic bandit reward model to determine a suitable function call template. These models include a framework used in decision-making scenarios where the query system (or a process executing thereon) must choose options (e.g., the function call templates) within unknown reward distributions. The goal is to maximize cumulative rewards over time. Further, the function call generator (206) includes functionality to perform at least a portion of the methods shown in FIGS. 3-4. One of ordinary skill will appreciate that the function call generator (206) may perform other functionalities without departing from the scope of the invention.

In one or more embodiments, the custom function library (208) includes functionality to store the function call templates. In one or more embodiments, the function call templates may be associated with a set of function call executors as shown in FIG. 2.2 below. Further, the custom function library (208) includes functionality to perform at least a portion of the methods shown in FIGS. 3-4. One of ordinary skill will appreciate that the custom function library (208) may perform other functionalities without departing from the scope of the disclosure.

In one or more embodiments, the function call executor (210) includes functionality to execute the function call(s) to generate a result(s) (e.g., a JSON result(s)). As discussed above, the function call executor (210) may be selected from a group of function call executors by the function call generator (206). Further, the call executor (210) includes functionality to perform at least a portion of the methods shown in FIGS. 3-4. One of ordinary skill will appreciate that the call executor (210) may perform other functionalities without departing from the scope of the invention.

In one or more embodiments, the Natural Language Generation (NLG) synthesizer (212) includes functionality to convert structured data (e.g., the results) into natural language results (e.g., human-like-text). In one or more embodiments, the NLG synthesizer include the functionality to produce natural language results in multiple languages (e.g., English, Spanish, Hindi, etc.). Further, the NLG synthesizer (212) includes functionality to perform at least a portion of the methods shown in FIGS. 3-4. One of ordinary skill will appreciate that the NLG synthesizer (212) may perform other functionalities without departing from the scope of the invention.

In one or more embodiments, the historical response data (214) may include past user queries and successful (and unsuccessful) responses associated with them. The success of a response may be determined by any means (e.g., user rank based approach).

In one or more embodiments, the auto decision mapper (216) includes functionality to determine whether the natural language results meet a predetermined threshold, e.g., using historical response data. Further, the auto decision mapper (216) includes functionality to perform at least a portion of the methods shown in FIGS. 3-4. One of ordinary skill will appreciate that the auto decision mapper (216) may perform other functionalities without departing from the scope of the invention.

FIG. 2.2 shows relationships between various components in the system in accordance with one or more embodiments of the invention. As discussed above, the query system includes multiple function call executors (e.g., 222A, 222B). Each of the function call executors is a process that includes functionality to execute a set of related function calls. Each function call executor is associated with a user intent (e.g., 220A, 220B) and each of the function calls that a given function call executor (e.g., 222A, 222B) is able to execute is associated with the corresponding user intent. Said another way, the function call executor can execute function calls related to a given user intent, where each of the function calls is for a different purpose; however, all of the different purposes are associated with the given user intent. The function calls (not shown) that a given function call executor can execute are generated using function call templates, where there is one function call template for each of the function calls. The function calls are ultimately generated by selecting an appropriate function call template and then modifying the function call template using the column and key information. The function call template includes the general structure of the function call, which is subsequently augmented with the column and key information to ultimately generate the function call. The process of generating the function call from the function call template is described below in FIG. 3.

Figure 3:
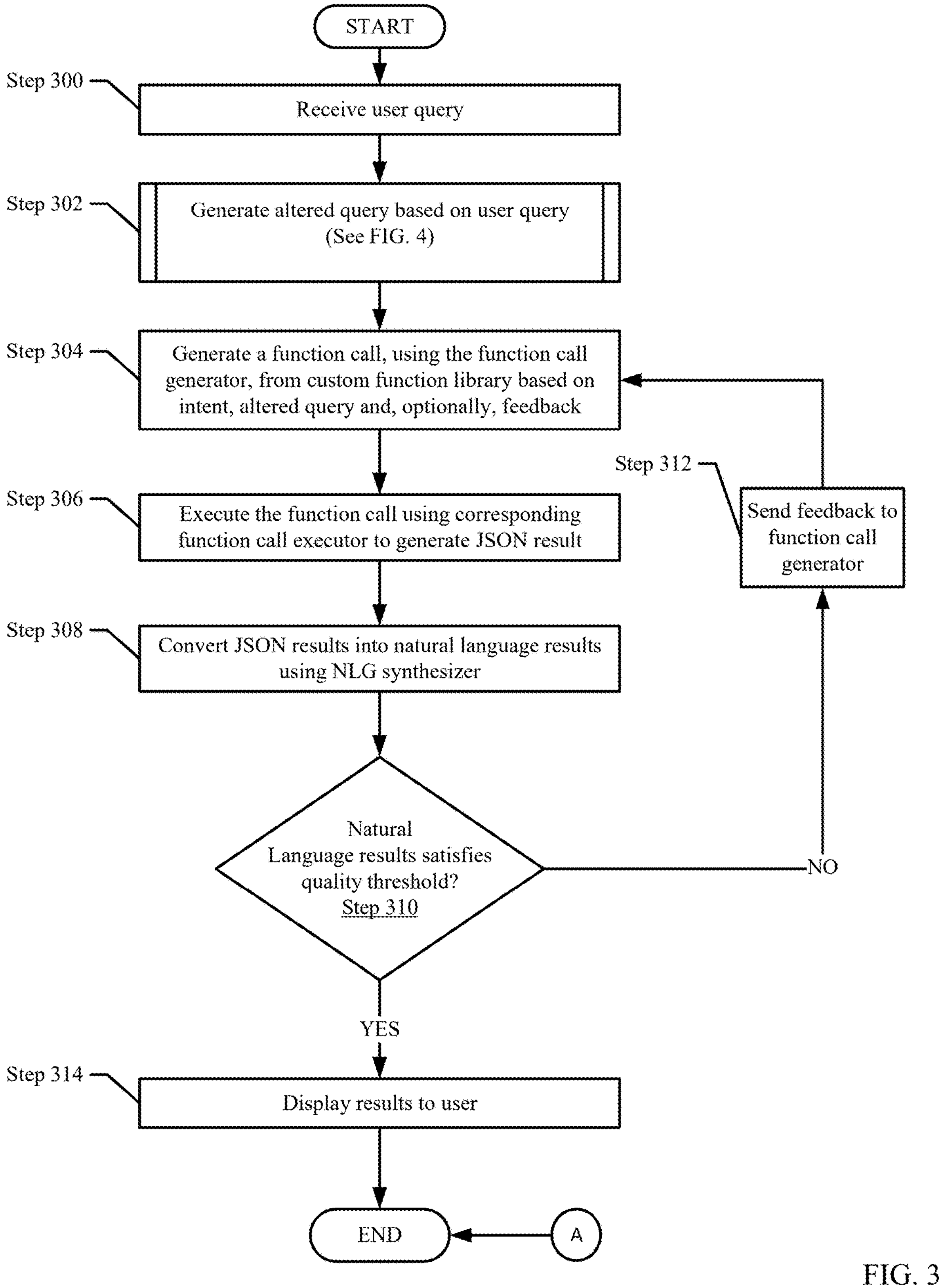
FIG. 3 shows a flowchart of a method for generating a response to a user query in accordance with one or more embodiments of the invention.

Turning to FIG. 3, FIG. 3 shows a flowchart describing a method for obtaining a response to user query in accordance with one or more embodiments disclosed herein. The method may be performed by, for example, a query system (e.g., 102, FIG. 2). Other components in the system may perform this method without departing from the invention.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIG. 4.

In step 300, a user query is received via a computing system (e.g., 100 in FIG. 1). The user query may be in the form of text, audio, video, touch, motion or any combination thereof. In one or more embodiments, the user query may include a multilingual input. It should be appreciated, that the user query may include structured data, unstructured data, or any combination thereof. As a non-limiting example, a user may want to identify information about the top three collectors in a company. In this example, the user may provide the following user query "Get the top 3 collectors working under John Smith based on CP in EMEA."

In step 302, an altered query is generated based on the user query. While the user query is typically in an unstructured natural language format, the altered query is in a structure or, more structured format. Continuing with the example above the user query in the example included in step 300 may be converted to the following altered query: "Get the top 3 collector_name working under manager_name based on current_percentage in region". Additional detail about the generation of the altered query in provided in FIG. 4 (described below).

In step 304, a function call is generated based on the altered query using a function call generator (e.g., FIG. 2.1, 206) and a customer function library (see e.g., 208, FIG. 2.1). In one or more embodiments, the function call generator (FIG. 2.1, 206) may choose a function call executor (e.g., 210 in FIG. 2.1) to execute the function call. The function call executor (e.g., 210 in FIG. 2.1) may be one of a set of function call executors as shown in FIG. 2.2. Further, each of the function call executors (e.g., 210 in FIG. 2.1) is associated with a function call executor definition. The function call executor definition defines the capabilities of the function call executor (e.g., 210 in FIG. 2.1). In one or more embodiments, a specific function call executor is selected (e.g., 210 in FIG. 2.1) when the Levenshtein distance between a user intent (which is obtained from the user query as discussed below) and a function call executor definition exceeds a predetermined threshold of, e.g., 0.9. It should be appreciated the invention to a predetermined threshold of 0.9; rather, any predetermined threshold may be used without departing from the invention. Further, other known or later discovered methods for selecting the function call executor may be used without departing from the invention.

In one or more embodiments, the function call generator (e.g., 206 in FIG. 2.1) selects a function call template from a set of function call templates associated with the selected function call executor (see, e.g., FIG. 2.2). The function call template may be selected using a multi-agent stochastic bandit's reward model, which is based on feedback from an auto decision mapper (e.g., 216 in FIG. 2.1). For example, if the function call generator is able to select from a set of function call templates, then the function call generator may select a function call template that has the least amount of negative feedback (i.e., feedback prior uses of the function call template) that are provided by the auto decision mapper. In one or more embodiments, the function call generator (e.g. 206 in FIG. 2.1) uses the altered query and the function call template to generate the function call. More specifically, the contents of the altered query is mapped into various portions of the function call template in order to generate the function call.

In step 306, the function call executor (e.g., 210 in FIG. 2.1) executes the function call to generate a result. In one embodiment, executing the function call results in one or more function calls (or queries) being issued to one or more data bases (not shown) (which correspond to the data base schemas (e.g., 104, FIG. 1)) and the databases returning the intermediate results to the function call executor. The intermediate result may include the information in one or more columns (i.e., information from the columns identified by the Column and Key Mapper (204, FIG. 2.1). If there are intermediate results from multiple data bases, these intermediate results are aggregated by the function call executor to ultimately generate the result. The result may be any format, e.g., the result may be in a JavaScript Object Notation (JSON) format. Those skilled in the art will appreciate that the result may be in any other structured format without departing from the invention.

In step 308, the result is converted into natural language results using a Natural Language Generation (NLG) synthesizer (e.g., 212 in FIG. 2.1).

In step 310, an auto decision mapper (e.g., 216 in FIG. 2.1) determines whether the natural language results satisfy a quality threshold. The quality threshold may be a predetermined threshold, which may be determined using historical response data (e.g., 214 in FIG. 2.1). If the natural language results are similar the natural language results of a similar query, the threshold may be met and the result will be YES but if they are not similar the threshold will not be met then the result will be NO. Accordingly, in one or more embodiments, if the result of this determination is YES, the method proceeds to step 314. In one or more embodiments, if the result of the determination is NO, the method may proceed to step 312.

In step 312, feedback from the auto decision mapper (e.g., 216 in FIG. 2.1) is sent to the function call generator (e.g., 206 in FIG. 2.1). The feedback includes a message informing the function call generator (e.g., 206 in FIG. 2.1) to generate a new function call using a different function call template from the set of function call templates associated with the function call executor (see e.g., FIG. 2.2). Further, the auto decision mapper (e.g., 216 in FIG. 2.1) flags the function call template that was used to generate the prior function call (i.e., the function call that ultimately a natural language result that did not satisfy the quality threshold) and informs the function call generator (e.g., 206 in FIG. 2.1) not to use the flagged function call template to service the user query (i.e., the user query in step 300). In one or more embodiments, the auto decision mapper (e.g., 216 in FIG. 2.1) may inform the function call generator (e.g., 206 in FIG. 2.1) not to use the flagged function call template for similar queries in the future. In one or more embodiments, steps 304-312 will continue to be performed until the auto decision mapper (e.g., 216 in FIG. 2.1) determines that the quality threshold has been satisfied, at which point the method will proceed to step 314.

In step 314, the natural language results are displayed to the user using the computing system (e.g., 100 in FIG. 1).

In one or more embodiments, the method may end following step 314.

Figure 4:
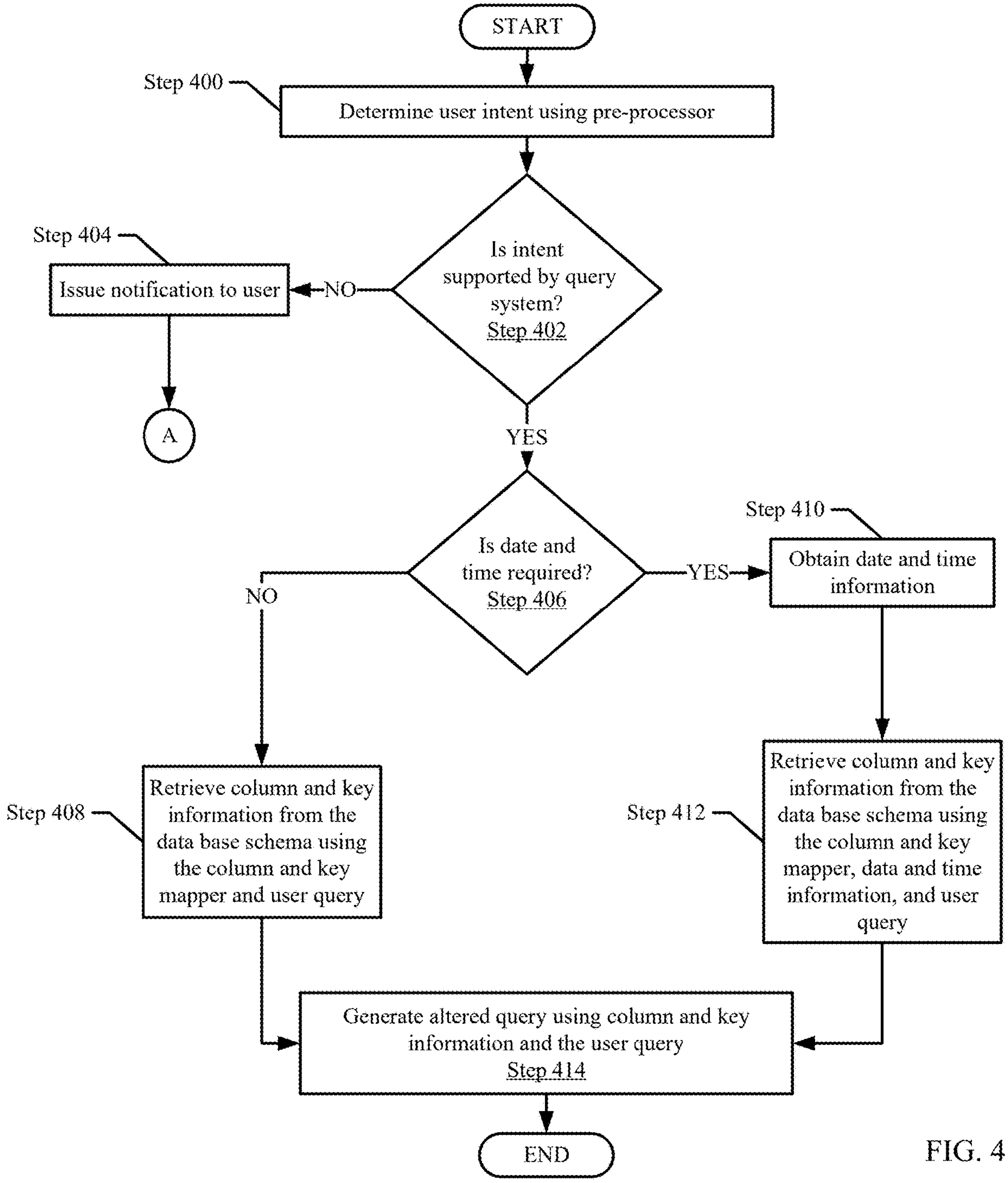
FIG. 4 shows a flowchart of a method for generating an altered query using a user query in accordance with one or more embodiments of the invention.

Turning to FIG. 4, FIG. 4 shows a flowchart describing a method for obtaining an altered query (i.e., step 302, FIG. 3) based on a user query in accordance with one or more embodiments disclosed herein. The method may be performed by, for example, the query system (e.g., 102 in FIG. 1). Other components in the system may perform this method without departing from the invention.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIG. 3.

In step 400, a user intent is determined from a user query using a pre-processor (e.g., 200 in FIG. 2.1). In one or more embodiments, the pre-processor (e.g., 200 in FIG. 2.1) determines the user intent using a multi-layer bidirectional transformer encoder-based model. These models leverage attention-based span based dynamic convolutions to accommodate contextual information in the text, thus increasing the accuracy. It should be appreciated, that any other method may be used to determine the user intent and that the method above is a non-limiting example. Referring to the example from step 300, the pre-processor may determine that the user query of "Get the top 3 collectors working under John Smith based on CP in EMEA" has a user intent of "collector performance".

In step 402, the pre-processor (e.g., 200 in FIG. 2.1) determines whether the intent is supported by the query system. It should be appreciated that any number of user intents may be supported by the query system as shown in FIG. 2.2. In one embodiment, the determination of whether the identified user intent is support is based on performing a look-up in the custom function library to determine whether there is a function call executor that is associated with the identified user intent. It should be further appreciated, that any other known or future discovered methods may be used to make this determination. If the result of this determination is YES, the method proceeds to step 406. Alternatively, if the result of the determination is NO, the method proceeds to step 404.

In step 404, the computing system (e.g., 100 in FIG. 1) issues a notification to the user that that the user intent is not supported and the process ends.

In step 406, when the user intent is supported, the pre-processor (e.g., 200 in FIG. 2.1) makes a determination as to whether time and date information is required to service the user query. It should be further appreciated, that any known methods may be used to make this determination. Accordingly, in one or more embodiments, if the result of this determination is YES, the method proceeds to step 410. In one or more embodiments, if the result of the determination is NO, the method may proceed to step 408. For example, if the user query is "Get the trend of collector Ethan Morgan based on ar_usd from the second quarter of 2022 until now", then the pre-processor may determines that date and time information is required to service the query. In another example, if a user query is "Get the top 3 collectors working under John Smith based on CP in EMEA", then the pre-processor may determines that date and time information is not required to service the query.

When date and time information is not required, then in step 408 column and key information is retrieved from a data base schema (e.g., 104 in FIG. 1) using a column and key mapper (e.g., 204 in FIG. 2.1) based upon the user query. The method then proceeds to step 414. As discussed above, the column and key information may include column names in a database associated the data base schema (e.g., 104 in FIG. 1). It should be appreciated that data base schema (e.g., 104 in FIG. 1) may include any number of column names and data associated with the column names. For example, if the user query is "Get the top 3 collectors working under John Smith based on CP in EMEA" then the column and key information may be "Region" "Manager_name," Collector_name," and "Current_percentage." The data table from the data base schema (e.g., 104 in FIG. 1) in the following example may be as follows:

| Region | Manager_Name | Collector_name | Current_percentage |
|---|---|---|---|
| emea | John Smith | Ethan Morgan | 89.06 |
| emea | John Smith | Olivia Brooks | 90.57 |
| emea | John Smith | Daniel Turner | 95.38 |

When date and time information is required, then in step 410, date and time information is obtained from the user query using a date and time mapper (e.g., 202 in FIG. 2.1). Date and time information may include any date and/or time ranges related to the user query. Revisiting the example in step 406, if the user query is, "Get the trend of collector Ethan Morgan based on ar_usd from the second quarter of 2022 until now," then the date and time mapper (e.g., 202 in FIG. 2.1) determines that that information between quarter two of 2022 and the current quarter is required to service the user query.

In step 412, column and key information is retrieved from the data base schema (e.g., 104 in FIG. 1) using the column and key mapper (e.g., 204 in FIG. 2.1) based upon the user query and the data and time information. The method then proceeds to step 414. Continuing with the example in step 410, the column names for the following user query "Get the trend of collector Ethan Morgan based on ar_usd from the second quarter of 2022 until now" may be, "Fy_fq and "Ar-usd". The data table from the data base schema (e.g., 104 in FIG. 1) in the following example may be as follows:

| Fy_fq | Ar_usd |
|---|---|
| FY2022Q02 | 16483574.55 |
| FY2022Q03 | 11156432.07 |
| FY2022Q04 | 11972903.09 |
| FY2023Q01 | 16830403.21 |
| FY2023Q02 | 6235455.04 |
| FY2023Q03 | 11345674.57 |
| FY2023Q04 | 17549767.01 |
| FY2024Q01 | 8648973.89 |
| FY2024Q02 | 13576312.54 |
| FY2024Q03 | 12453570.67 |

The process may arrive at step 414 via step 408 or 412. In step 414, the pre-processor (e.g., 200 in FIG. 2.1) generates the altered query using the column and key information and the user query. It should be appreciated that altered query may include structured data or a combination of structured and unstructured data. Continuing with the example in step 408, the user query "Get the top 3 collectors working under John Smith based on CP in EMEA" may be converted into an altered query reading "Get the top 3 collector_name working under manager_name based on current_percentage in region."

In one or more embodiments, the method may end following step 414.

Figure 5:
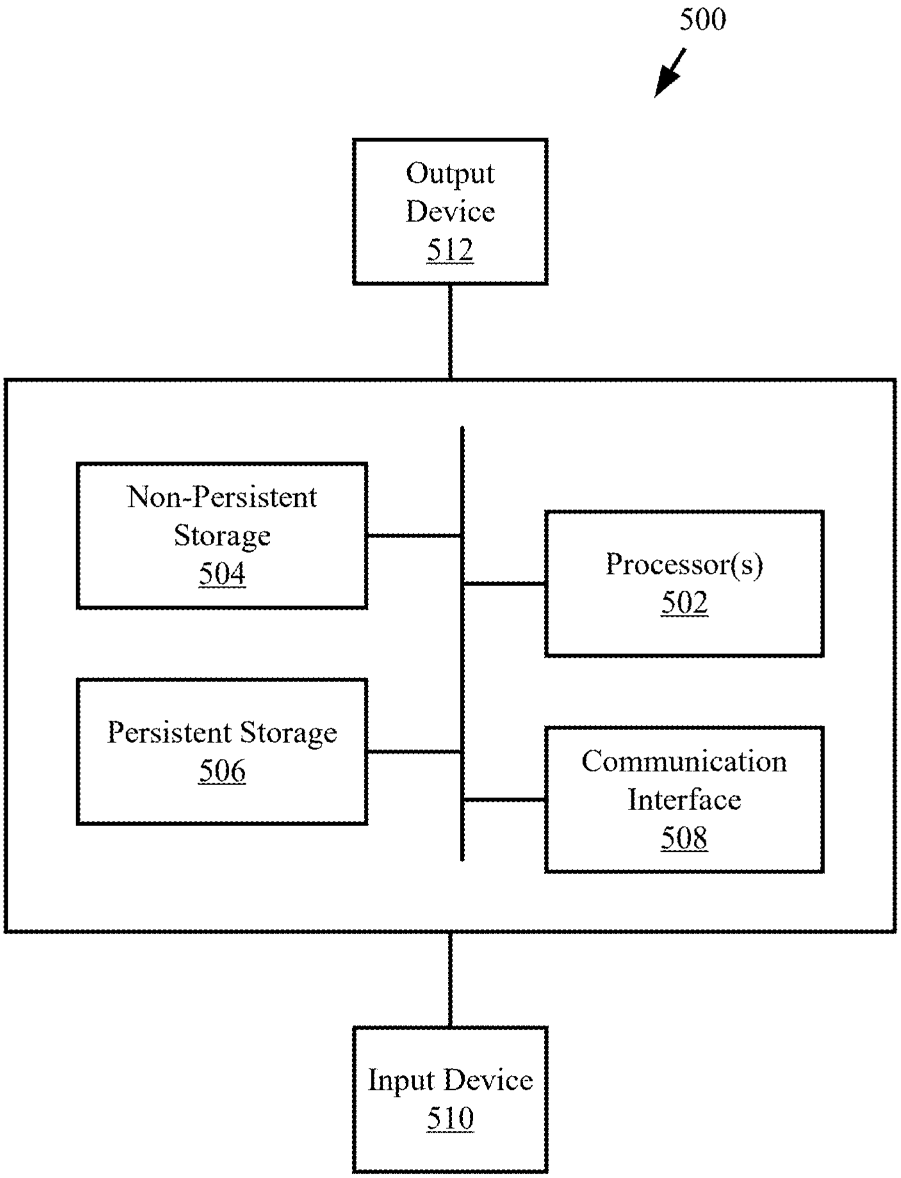
FIG. 5 shows a computing system in accordance with one or more embodiments of the invention.

Embodiments of the disclosure may be implemented using computing devices. FIG. 5 shows a diagram of a computing device (500) in accordance with one or more embodiments. The computing device (500) may include one or more computer processor(s) (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), input devices (510), output devices (512), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. The communication interface (508) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment, the computing device (500) may include one or more output devices (512), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (510, 512) may be locally or remotely connected to the computer processor(s) (502), non-persistent storage (504), and persistent storage (506). Many diverse types of computing devices exist, and the aforementioned input and output device(s) (510, 512) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

Specific embodiments will now be described with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the prior description of the figures, any component described with regard to a figure, in various embodiments of the invention, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for query response generation using a query system, the method comprising:

receiving a user query from a user;

generating an altered query using the user query, wherein the altered query is associated with a user intent of the user, wherein the user intent is determined using a multi-layer bidirectional transformer encoder-based model;

selecting, in response to generating the altered query, a function call executor of a plurality of function call executors to obtain a selected function call executor, wherein the selecting is based on a Levenshtein distance between the user intent and a definition of the selected function call executor exceeding a predetermined threshold, and wherein the definition defines capabilities of the selected function call executor;

generating, following selecting the function call executor, a function call using the user intent and the altered query, wherein:

the function call is further generated using a custom function library, the custom function library comprises a plurality of function call templates, each of the plurality of function call templates is associated with one of a plurality of user intents, the user intent is one of the plurality of user intents, a function call template is selected from the plurality of function call templates based on:

the user intent;

the definition of the selected function call executor; and feedback from prior use of the plurality of function call templates, wherein the function call template has a least amount of negative feedback compared to other function call templates of the plurality of function call templates; and the function call is further generated using the function call template;

executing, using the selected function call executor, the function call to generate a result;

converting the result into a natural language result;

making a first determination that the natural language result satisfies a predetermined threshold; and providing, in response to the first determination, the natural language result to the user.

2. The method of claim 1, wherein the function call template is selected from a second plurality of function call templates associated with the user intent, and wherein the second plurality of function call templates is a subset of the plurality of function call templates.

3. The method of claim 2, wherein the function call template is selected using a multi-agent stochastic bandits reward model, and wherein the multi-agent stochastic bandits reward model uses historical results associated with prior user queries.

4. The method of claim 1, further comprising:

receiving a second user query from a user;

generating a second altered query using the second user query, wherein the second altered query is associated with a second user intent of the user;

generating a second function call using the second user intent and the second altered query;

executing the second function call to generate a second result;

converting the second result into a second natural language result;

making a second determination that the second natural language result does not satisfy the predetermined threshold; and sending, in response to the second determination, feedback to a function call generator, wherein the feedback is used to generate a third function call to service the second user query.

5. The method of claim 1, wherein generating the altered query comprises:

obtaining, based on the user query, the user intent;

making a second determination that the user intent is supported by the query system;

making a third determination, based on the user query, that date and time information is not required;

based on the second determination and the third determination:

retrieving, from a data base schema using a column and key mapper and the user query, column and key information; and generating, using the column and key information, the altered query.

6. The method of claim 5, wherein the column and key information comprises a column name in a data base associated with the data base schema.

7. The method of claim 1, wherein generating the altered query comprises:

obtaining, based on the user query, the user intent;

making a second determination that the user intent is supported by the query system;

making a third determination, based on the user query, that date and time information is required;

based on the second determination and the third determination:

retrieving the date and time information;

retrieving column and key information from a data base schema using a column and key mapper, the date and time information, and the user query; and generating, using the column and key information, the altered query.

8. The method of claim 1, further comprising:

receiving a second user query from the user;

obtaining a second user intent associated with the second user query;

making a second determination that the second user intent is not supported; and in response to the second determination, issuing a notification to the user that the second user query cannot be processed.

9. The method of claim 1, wherein the result is a JavaScript Object Notation (JSON) result.

10. A non-transitory computer readable medium (CRM) comprising computer readable program code, which when executed by a computer processor, enables the computer processor to perform a method for query response generation using a query system, the method comprising:

receiving a user query from a user;

generating an altered query using the user query, wherein the altered query is associated with a user intent of the user, wherein the user intent is determined using a multi-layer bidirectional transformer encoder-based model;

selecting, in response to generating the function call, a function call executor of a plurality of function call executors to obtain a selected function call executor, wherein the selecting is based on a Levenshtein distance between the user intent and a definition of the selected function call executor exceeding a predetermined threshold, and wherein the definition defines capabilities of the selected function call executor;

generating, following selecting the function call executor, a function call using the user intent and the altered query, wherein:

the function call is further generated using a custom function library, the custom function library comprises a plurality of function call templates, each of the plurality of function call templates is associated with one of a plurality of user intents, the user intent is one of the plurality of user intents, a function call template is selected from the plurality of function call templates based on:

the user intent;

the definition of the selected function call executor; and feedback from prior use of the plurality of function call templates, wherein the function call template has a least amount of negative feedback compared to other function call templates of the plurality of function call templates; and the function call is further generated using the function call template;

executing, using the selected function call executor, the function call to generate a result;

converting the result into a natural language result;

making a first determination that the natural language result satisfies a predetermined threshold; and providing, in response to the first determination, the natural language result to the user.

11. The non-transitory CRM of claim 10, wherein the function call template is selected from a second plurality of function call templates associated with the user intent, wherein the second plurality of function call templates is a subset of the plurality of function call templates, wherein the function call template is selected using a multi-agent stochastic bandits reward model, and wherein the multi-agent stochastic bandits reward model uses historical results associated with prior user queries.

12. The non-transitory CRM of claim 10, wherein generating the altered query comprises:

obtaining, based on the user query, the user intent;

making a second determination that the user intent is supported by the query system;

making a third determination, based on the user query, that date and time information is not required;

based on the second determination and the third determination:

retrieving, from a data base schema using a column and key mapper and the user query, column and key information; and generating, using the column and key information, the altered query.

13. A method for query response generation using a query system, the method comprising:

receiving a user query from a user, wherein the user query is associated with a user intent, wherein the user query is unstructured;

generating an altered query using the user query, wherein at least a portion of the altered query is structured;

selecting, in response to generating the function call, a function call executor of a plurality of function call executors to obtain a selected function call executor, wherein the selecting is based on a Levenshtein distance between the user intent and a definition of the selected function call executor exceeding a predetermined threshold, and wherein the definition defines capabilities of the selected function call executor;

generating, following selecting the function call executor, a function call using the user intent and the altered query, wherein:

the function call is further generated using a custom function library, the custom function library comprises a plurality of function call templates, each of the plurality of function call templates is associated with one of a plurality of user intents, the user intent is one of the plurality of user intents, a function call template is selected from the plurality of function call templates based on:

the user intent;

the definition of the selected function call executor; and feedback from prior use of the plurality of function call templates, wherein the function call template has a least amount of negative feedback compared to other function call templates of the plurality of function call templates; and the function call is further generated using the function call template;

executing, using the selected function call executor the function call to generate a result;

converting the result into a natural language result;

making a determination that the natural language result satisfies a predetermined threshold; and providing, in response to the determination, the natural language result to the user.

* * * * *